United States Patent [19]

Schierling et al.

[11] Patent Number: 4,932,370

[45] Date of Patent: Jun. 12, 1990

[54] FUEL INJECTION ARRANGEMENT

[75] Inventors: Roland Schierling, Affalterbach; Werner Geyer, Waiblingen, both of Fed. Rep. of Germany

[73] Assignee: Andreas Stihl, Waiblingen, Fed. Rep. of Germany

[21] Appl. No.: 407,338

[22] Filed: Sep. 14, 1989

[30] Foreign Application Priority Data

Sep. 16, 1988 [DE] Fed. Rep. of Germany ....... 3831490

[51] Int. Cl.$^5$ ..................... F02M 57/20; F02B 33/04
[52] U.S. Cl. ..................... 123/73 AD; 123/DIG. 5; 123/73 C
[58] Field of Search ........... 123/73 A, DIG. 5, 73 B, 123/73 C, 73 AD, 495; 417/392, 380, 395, 401

[56] References Cited

U.S. PATENT DOCUMENTS

| | | | |
|---|---|---|---|
| 1,219,938 | 3/1917 | Hamilton | 123/DIG. 5 |
| 4,471,728 | 9/1984 | Borst | 123/73 AD |
| 4,473,340 | 9/1984 | Walsworth | 123/73 AD |
| 4,539,949 | 9/1985 | Walsworth | 123/73 AD |
| 4,551,076 | 11/1985 | Dubois | 123/DIG. 5 |
| 4,552,101 | 11/1985 | Borst | 123/DIG. 5 |
| 4,700,668 | 10/1987 | Schierling | 123/73 C |
| 4,846,119 | 7/1989 | Geyer | 123/73 C |

FOREIGN PATENT DOCUMENTS 2248584 4/1974 Fed. Rep. of Germany .

Primary Examiner—Carl Stuart Miller
Attorney, Agent, or Firm—Walter Ottesen

[57] ABSTRACT

Fuel injection arrangements having pneumatically driven injection pumps utilize the fluctuating crankcase pressure whereby the injection time point is fixed by the system. The injection time point can be fixed so as to depart from the course of the pressure in the crankcase if the crankcase pressure is applied to the injection pump via an opening controlled by the piston and if the pressure drop is directed to the combustion chamber via a relief opening. However, it has been shown that this kind of control produces considerable problems with respect to fast-running two-stroke engines. Accordingly, it is a feature of the invention to provide a check valve in the connection between the relief opening and the injection pump and to position this check valve so that it opens in the flow direction toward the combustion chamber. In this way, high pressures which occur as a consequence of incomplete or irregular combustions in the combustion chamber cannot have a feedback effect on the injection pump and the quantity injected is not increased in a disadvantageous manner for the next cycle.

6 Claims, 1 Drawing Sheet

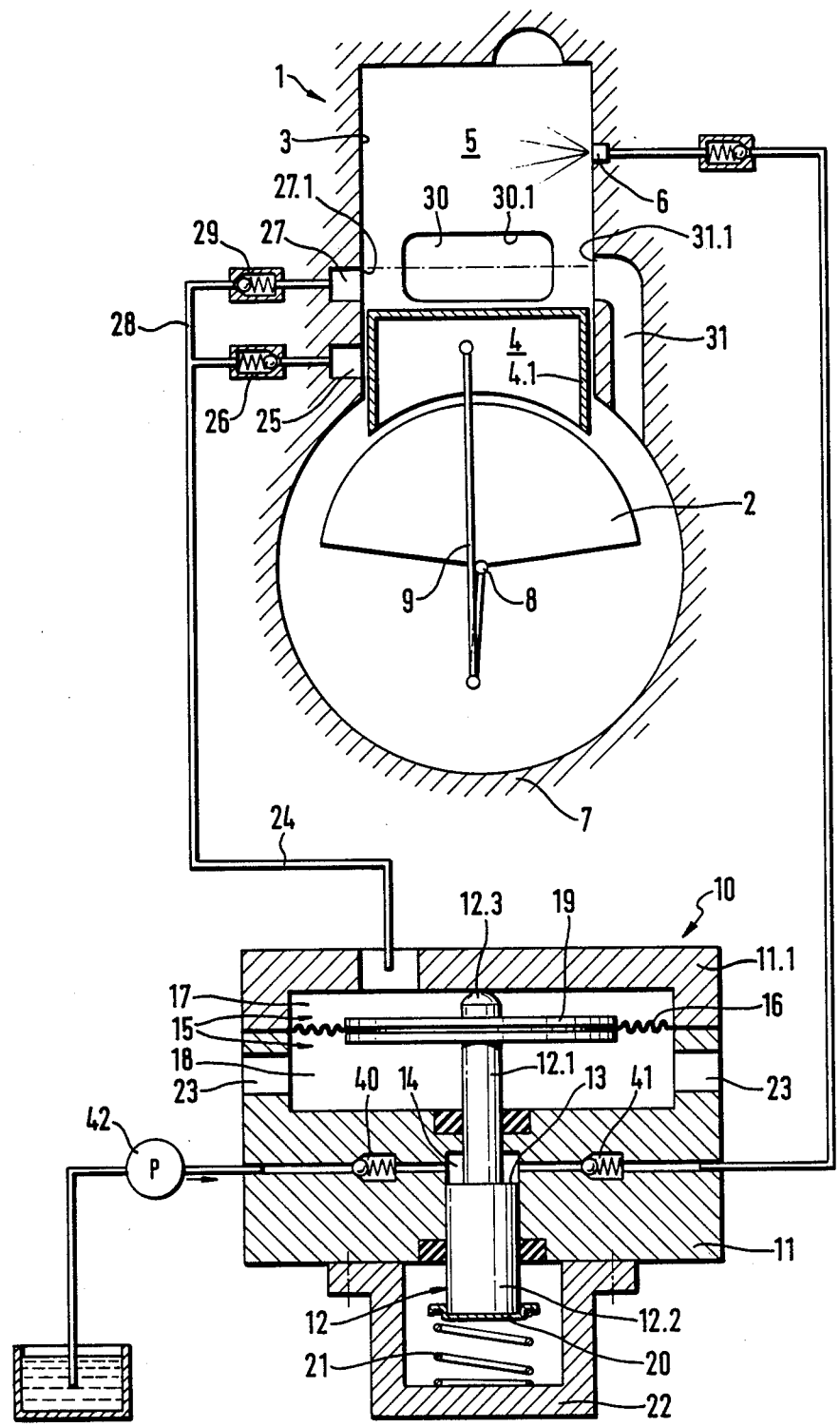

FUEL INJECTION ARRANGEMENT

FIELD OF THE INVENTION

The invention relates to a fuel injection arrangement for two-stroke engines, especially for portable handheld tools such as motor-driven chain saws or the like.

BACKGROUND OF THE INVENTION

Fuel injection arrangements of the kind referred to above utilize the fluctuating crankcase pressure for driving an injection pump and for injecting fuel. The pressure in the crankcase is dependent upon the rotational speed and the load of the two-stroke engine. An overpressure develops in the crankcase during the downward movement of the piston in the direction toward bottom dead center; whereas, with the following upward movement of the piston to top dead center, the crankcase pressure drops to an underpressure. The crankcase pressure fluctuates thereby between positive and negative values with the positive values likewise increasing to a maximum with increasing speed and the positive values then remain constant up to the highest speed. The pressure fluctuations lie, for example, approximately between 0.75 and −0.2 bar.

German published patent application No. 2,248,584 discloses a fuel injection arrangement wherein the increasing pressure in the crankcase operates on a pressure receiving surface of the pump piston and displaces the latter to carry out a suction stroke. Fuel is drawn into the pump chamber which is secured by check valves. The positive crankcase pressure drops in the region of bottom dead center so that the pulse chamber becomes pressureless and the pump piston carries out a pumping stroke actuated by the force of the spring. This pumping stroke lies about or shortly after bottom dead center and effects the injection of fuel into the combustion chamber. A late injection of fuel of this kind may be adequate for slow-running two-stroke engines. However, this type of injection is unsuitable for fast-running two-stroke engines.

For the above reason, the initiation of the injection operation is largely decoupled from the course of the pressure in fuel injection arrangements of the kind discussed above. For decoupling, a relief opening is provided which discharges the pulse chamber into the combustion chamber as soon as the relief opening is reached by the movable part of the two-stroke engine. The increasing crankcase pressure is conducted to the pulse chamber via the control opening in the range of the crankshaft angle of 80° to 100° and the control opening is closed before bottom dead center is reached. Significantly in advance of bottom dead center, a discharge of the pulse chamber into the combustion chamber is possible via the relief opening whereby the injection is initiated. This injection then lies ahead of bottom dead center and is also applicable to fast-running two-stroke engines. Experience has shown that it is especially in fast-running two-stroke engines that short-term conditions can occur which effect a high pressure in the combustion chamber at the point in time that the relief opening is controlled. Such conditions can occur with delayed combustion, incomplete combustion or the like. The high pressure acts on the pulse chamber via the relief opening and causes the pump piston to be displaced still further whereby its suction stroke and thereby the quantity of fuel drawn in by suction is increased. The two-stroke engine receives a quantity of fuel which is too great in the injection which follows which, in turn, leads to irregular conditions in the combustion chamber and thereby to a build-up of a combustion error.

SUMMARY OF THE INVENTION

It is an object of the invention to provide a fuel injection arrangement wherein the influences which build up because of irregular combustion are reduced.

The fuel injection arrangement of the invention is for a two-stroke engine, especially for handheld portable tools such as motor-driven saws or the like. The engine has a piston and a cylinder conjointly defining a combustion chamber and has a crankshaft connected to the piston and a crankcase wherein pressure is developed in response to the movement of the piston through a piston stroke. The fuel injection arrangement includes: control opening means communicating with the crankcase; relief opening means communicating with the combustion chamber; control means operatively connected to the crankshaft for clearing and blocking each of the opening means as a predetermined function of the movement of the piston in the cylinder; the relief opening means being positioned with respect to the control opening means so as to be cleared by the control means when the control means blocks the control opening means; an injection nozzle opening into the combustion chamber; a fuel injection pump including: a housing defining an enclosed work space; membrane means partitioning the work space into a pulse chamber and a return chamber; a pump chamber arranged in the housing; a pump cylinder communicating with the pump chamber; a pump piston connected to the membrane means and being slideably mounted in the pump cylinder so as to be reciprocally movable through a piston stroke away from a start position and back to the start position; and, resilient biasing means for resiliently biasing the pump piston into the start position; fuel supply means connected to the pump chamber for supplying fuel to the latter; fuel metering line means for conducting the fuel from the pump chamber to the engine via the injection nozzle opening; a first connecting line connecting the pulse chamber to the crankcase through the control opening means for charging the pulse chamber with the pressure present in the crankcase for actuating the membrane means to develop an actuating force for driving the pump piston out of the start position against the force of the resilient biasing means and into the pump chamber; a second connecting line connecting the pulse chamber to the combustion chamber via the relief opening means when the relief opening means is cleared by the control means; and, check valve means mounted in the second connecting line so as to open in the direction of the combustion chamber to prevent high pressure developed in the combustion chamber because of incomplete or irregular combustion to reach the pulse chamber and to act on the membrane means.

The check valve arranged in the flow path between the relief opening and the pulse chamber opens in the direction of flow toward the combustion chamber. This check valve assures that pressure jumps do not reach the pulse chamber so that these pressure jumps occurring during irregular combustion cannot act on the injection pump. In the cycle which follows, the quantity of fuel is injected which is necessary for a proper combustion and is adapted to the speed of the two-stroke engine. Irregular combustions which occur are therefore only present for a short time and are mostly limited to the ignition stroke and hardly disturb the synchronism of a fast-running two-stroke engine.

BRIEF DESCRIPTION OF THE DRAWING

The single figure of the drawing is a schematic of a two-stroke engine equipped with a fuel injection arrangement according to the invention.

DESCRIPTION OF THE PREFERRED EMBODIMENTS OF THE INVENTION

Referring to the drawing, reference numeral 1 identifies a two-stroke engine which is used especially for portable handheld tools such as motor-driven chain saws or the like. The engine includes a cylinder 3, a piston 4, a combustion chamber 5, an injection nozzle 6, a crankcase 7 as well as a crankshaft 8 having a crank web 2 and a connecting rod 9 for the piston 4. During operation of the two-stroke engine, the pressure in the crankcase 7 changes with the upward and downward movement of the piston 4. The pressure increases with the downward movement of the piston 4 from top dead center until approximately bottom dead center so that an overpressure develops in the crankcase which again drops to an underpressure with the upward movement of the piston 4. This fluctuation of the crankcase pressure is utilized as a drive for the injection pump 10.

The injection pump 10 includes a housing 11 wherein a pump piston 12 is mounted. The pump piston 12 is configured as a differential piston with the annular surface 13 of the differential piston delimiting the pump chamber 14 provided in housing 11. The segment 12.1 of the pump piston 12 extends in a pressure-tight manner out of the pump chamber 14 and lies with its free end 12.3 against the inner wall surface of a cover 11.1 which acts as an abutment. The cover 11.1 and the housing 11 conjointly define a work chamber 15. A membrane 16 and a membrane plate 19 conjointly partition the work chamber 15 into a pulse chamber 17 and a return chamber 18. The membrane 16 is annular and has an outer peripheral edge portion which is tightly clamped between the cover 11.1 and the housing 11; whereas, an inner edge portion of the membrane 11 is held tightly on the membrane plate 19. The membrane plate 19 is fixedly mounted to the free end of the pump piston segment 12.1.

The segment 12.2 of the pump piston 12 is configured to have a larger diameter and extends out of the housing 11 in a pressure-tight manner. The segment 12.2 lies against a helical spring 21 via a spring plate 20 and the spring 21 is, in turn, braced at the base of a cup-shaped holder 22. The holder 22 surrounds the pump piston segment 12.2 approximately coaxially and is attached to the housing 11.

The return chamber 18 communicates with the ambient atmosphere via vent openings 23; whereas, the pulse chamber 17 is connected to a control opening 25 via a channel 24. The control opening 25 is preferably arranged at the end of the cylinder 3 facing toward the crankcase 7 and is disposed in the cylinder. In the embodiment shown, the control opening 25 is closed by the piston 4 at about the bottom dead center position thereof. The piston 4 can be so arranged that the control opening 25 is closed beginning at a crankshaft angle of approximately 60° to 80° ahead of bottom dead center and up to a crankshaft angle of 60° to 80° after bottom dead center. Since it is intended that only an overpressure present in the crankcase 7 should extend into the pulse chamber 17 via the control opening 25, a check valve 26 is mounted in the channel 24 so that it opens in the flow direction toward the pulse chamber 17.

A relief opening 27 is arranged above the control opening 25 in the peripheral wall of the cylinder 3. The relief opening 25 opens into the combustion chamber 5 at the bottom dead center position of the piston 4. The relief opening 27 is connected directly to the pulse chamber 17 via the relief channel 28. According to a feature of the invention, a check valve 29 is arranged in the relief channel 28 so that it can open in the flow direction toward the combustion chamber 5.

The upper edge 27.1 of the relief opening 27 lies facing toward the cylinder head and is clearly below the upper control edge 30.1 of the exhaust gas channel 30. The control edge 27.1 of the relief opening 27 preferably lies approximately in the center of the exhaust gas channel 30. It is advantageous to arrange the relief opening 27 approximately opposite the opening 31.1 of the overflow channel 31.

When the piston 4 moves from top dead center in the direction toward the bottom dead center position shown in the drawing, the pressure in the crankcase 7 first increases and can extend to the pulse chamber 17 through the control opening 25 and the opening check valve 27 via channel 24. After the piston is at a position corresponding to approximately a crankshaft angle of 100° after top dead center, the piston skirt 4.1 closes the lower control opening 25 so that the pressure which continues to increase in the crankcase 7 is without influence on the self-adjusted pressure level in the pulse chamber 17. In this position, the piston 4 already has passed over the upper control edge 30.1 of the exhaust gas channel 30 so that the pressure in the combustion chamber 5 has been able to decrease. After a position of the piston corresponding to approximately half opening of the exhaust gas channel 30 and preferably already after passing over the upper control edge 31.1 of the overflow channel 31, the control edge 27.1 of the relief opening 27 is passed whereby the relief opening 27 is cleared. If the pressure in the combustion chamber 5 has reduced, which is assured when there is a proper combustion, the pressure present in the pulse chamber 17 can flow away via the check valve 29 and the relief opening 27 to the combustion chamber 5 whereby the pulse chamber 17 again becomes pressureless.

The pump piston 12 is displaced against the force of spring 21 because of the pressure in the pulse chamber 17. The pump piston 12 travels under the force of the spring 21 back into the initial position shown in the figure and pumps the fuel drawn in by suction via the check valve 40 during the suction stroke in the pump chamber 14. The fuel is pumped via the check valve 41 to the injection nozzle 6 where the fuel passes into the combustion chamber finely atomized. In the compression stroke, the combustion air which has flowed in and the injected fuel mist are compressed and ignited whereby the piston is again accelerated out of its top dead center position in the direction toward its bottom dead center position and the injection process described above begins anew.

The fuel is fed to the pump chamber 14 via a fuel feed pump 42 so that a full pump chamber 14 is assured for each suction stroke.

An injection time point in advance of bottom dead center can be realized by means of the position of the control opening 25 and the relief opening 27 which is absolutely necessary in fast-running two-stroke engines such as the kind utilized in motor-driven chain saws.

It is understood that the foregoing description is that of the preferred embodiments of the invention and that various changes and modifications may be made thereto without departing from the spirit and scope of the invention as defined in the appended claims.

What is claimed is:

1. A fuel injection arrangement for a two-stroke engine, especially for handheld portable tools such as motor-driven saws or the like, the engine having a piston and a cylinder conjointly defining a combustion chamber and having a crankshaft connected to the piston and a crankcase wherein pressure is developed in response to the movement of the piston through a piston stroke, the fuel injection arrangement comprising:

control opening means communicating with said crankcase;

relief opening means communicating with the combustion chamber;

control means operatively connected to the crankshaft for clearing and blocking each of said opening means as a predetermined function of the movement of the piston in the cylinder;

said relief opening means being positioned with respect to said control opening means so as to be cleared by said control means when said control means blocks said control opening means;

an injection nozzle opening into the combustion chamber;

a fuel injection pump including: a housing defining an enclosed work space; membrane means partitioning said work space into a pulse chamber and a return chamber; a pump chamber arranged in said housing; a pump cylinder communicating with said pump chamber; a pump piston connected to said membrane means and being slideably mounted in said pump cylinder so as to be reciprocally movable through a piston stroke away from a start position and back to said start position; and, resilient biasing means for resiliently biasing said pump piston into said start position;

fuel supply means connected to said pump chamber for supplying fuel to the latter;

fuel metering line means for conducting the fuel from said pump chamber to the engine via said injection nozzle opening;

a first connecting line connecting said pulse chamber to the crankcase through said control opening means for charging said pulse chamber with the pressure present in the crankcase for actuating said membrane means to develop an actuating force for driving said pump piston out of said start position against the force of said resilient biasing means and into said pump chamber;

a second connecting line connecting said pulse chamber to the combustion chamber via said relief opening means when said relief opening means is cleared by said control means; and, check valve means mounted in said second connecting line so as to open in the direction of said combustion chamber to prevent high pressure developed in said combustion chamber because of incomplete or irregular combustion to reach said pulse chamber and to act on said membrane means.

2. The fuel injection arrangement of claim 1, said control opening means being a control opening formed in the cylinder; and, said relief opening means being a relief opening formed in the cylinder; and, said control means being said piston.

3. The fuel injection arrangement of claim 2, wherein the cylinder has an exhaust gas opening formed therein defining an upper control edge and said relief opening having an upper control edge disposed at an elevation below said upper control edge of said exhaust gas opening.

4. The fuel injection arrangement of claim 3, said exhaust gas opening also having a lower control edge and the elevation of said upper control edge of said relief opening being at an elevation corresponding to approximately the mid elevation between said upper and lower control edges of said exhaust gas opening.

5. The fuel injection arrangement of claim 2, said control opening being disposed in said cylinder so as to be closed in the position of the crankshaft corresponding to an angular range thereof from approximately 60° to 80° ahead of bottom dead center to approximately 60° to 80° after bottom dead center.

6. The fuel injection arrangement of claim 2, said relief opening being disposed in said cylinder so as to be cleared at an angular position of the crankshaft of approximately 120° after top dead center.

* * * * *